(12) United States Patent
Shinohara

(10) Patent No.: US 7,659,230 B2
(45) Date of Patent: Feb. 9, 2010

(54) THERMOPLASTIC RESIN COMPOSITION CONTAINING MESOPOROUS POWDERS ABSORBED WITH LUBRICATING OILS

(75) Inventor: Kenichi Shinohara, Tochigi (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 656 days.

(21) Appl. No.: 11/281,520

(22) Filed: Nov. 17, 2005

(65) Prior Publication Data

US 2006/0111249 A1    May 25, 2006

Related U.S. Application Data

(60) Provisional application No. 60/630,841, filed on Nov. 24, 2004.

(51) Int. Cl.
  F16C 33/18    (2006.01)
  F16C 33/04    (2006.01)
  C10M 173/02   (2006.01)

(52) U.S. Cl. .................. 508/107; 508/101; 508/115

(58) Field of Classification Search ............. 508/107, 508/101, 115
  See application file for complete search history.

(56) References Cited

U.S. PATENT DOCUMENTS 4,829,093 A    5/1989    Matsukawa et al.
5,679,743 A *  10/1997   Hirai et al. .............. 525/88
6,569,816 B2 *  5/2003   Oohira et al. ............ 508/107
2003/0134104 A1 * 7/2003 Hokkirigawa et al. .... 428/317.9

FOREIGN PATENT DOCUMENTS

| GB | 1043844 | 9/1966 |
| GB | 1070537 | 6/1967 |
| JP | 46-5321 | 2/1971 |
| JP | 46-42217 | 12/1971 |
| JP | 47-42615 | 10/1972 |
| JP | 48-7855 | 3/1973 |
| JP | 3-217488 | 9/1991 |
| JP | 4-160224 | 6/1992 |
| JP | 2002-346381 | 12/2002 |
| JP | 2003-286196 | 10/2003 |

OTHER PUBLICATIONS

PCT International Search Report and Written Opinion for PCT International Application No. PCT/US2005/042198 dated Apr. 4, 2006.

* cited by examiner

*Primary Examiner*—Walter D Griffin
*Assistant Examiner*—Frank C Campanell
(74) *Attorney, Agent, or Firm*—Loretta Smith

(57) ABSTRACT

Thermoplastic resin compositions comprising a thermoplastic polymer and a lubricating oil-impregnated mesoporous powder. The compositions comprise about 0.3 to about 2 weight percent of lubricating oil, based on the total weight of the composition and are able to maintain a low coefficient of friction and minimal wear over an extended period of use.

17 Claims, 1 Drawing Sheet

THERMOPLASTIC RESIN COMPOSITION CONTAINING MESOPOROUS POWDERS ABSORBED WITH LUBRICATING OILS

CROSS REFERENCE TO RELATED APPLICATION

This application claims the benefit of U.S. Provisional Application No. 60/630,841 filed Nov. 24, 2004.

FIELD OF THE INVENTION

The present invention relates to resin compositions. More specifically, it relates to resin compositions comprising a thermoplastic resin and a lubricating oil-impregnated mesoporous powder, and that are useful for molding articles that retain lubricity for an extended period of time.

BACKGROUND OF THE INVENTION

Resins such as polyamides and polyacetals, because of their low friction coefficient and excellent mechanical strength and chemical stability, are widely used in the fabrication of molded articles that require lubrication, such as bearing bushings, gears, cams, rollers, bearings, switch sliders and fasteners.

However, even these resins are not always able to deliver a satisfactory performance under relatively demanding conditions such as those encountered in rolling stock and industrial machinery. Hence, lubrication with substances such as oil or grease is normally carried out. However, in lubrication with oil or grease, loss of lubrication may occur over time as the oil or grease comes off the sliding or mating surface during use. Deleterious effects that arise with loss of lubrication include increased energy required to overcome the resulting increased friction at moving surfaces and rapid wear of the molded article.

One approach to this problem that has been taken in the prior art involves impregnating a lubricating oil into the resin (such as polyacetal, polyamide or polyphenylene sulfide) making up the molded article requiring lubrication, and using the impregnated lubricating oil to carry out lubrication (see JP-B 46-42217, JP-B 46-5231, JP-B 47-42615 and JP-B 48-7865). JP 2003-286196 A discloses porous particles impregnated with substances such as pigments, perfumes, agrochemicals, or medicines. JP 2002-346381 A discloses water-absorbing fine particle material.

However, when a resin impregnated with lubricating oil is subjected to heat and pressure during molding, the lubricating oil separates out, making it impossible to carry out molding using conventional pellets. Moreover, when components that have been manufactured from a lubricating oil-impregnated resin are used over an extended period of time, the coefficient of friction between the components and the surfaces against which they are in motion increases, thus increasing the amount of wear. Accordingly, there has existed a need for resin compositions capable of maintaining a low coefficient of friction coefficient and low levels of wear over an extended period of time.

There has also been a strong desire for resin compositions that do not experience loss of lubrication and are able to maintain a low coefficient of friction and minimize wear over time.

It is desirable for the present invention to provide resin compositions, which contain a thermoplastic resin and a lubricant-impregnated mesoporous powder. It is also desirable that the present invention provides articles shaped from such compositions.

SUMMARY OF THE INVENTION

In one aspect of this invention, there is a thermoplastic resin composition comprising: at least one thermoplastic polymer and at least one lubricating oil-impregnated mesoporous powder; wherein the total amount of lubricating oil present in the composition is between about 0.3 and about 2 weight percent, based on the total weight of the composition.

DETAILED DESCRIPTION OF THE INVENTION

Figure 1:
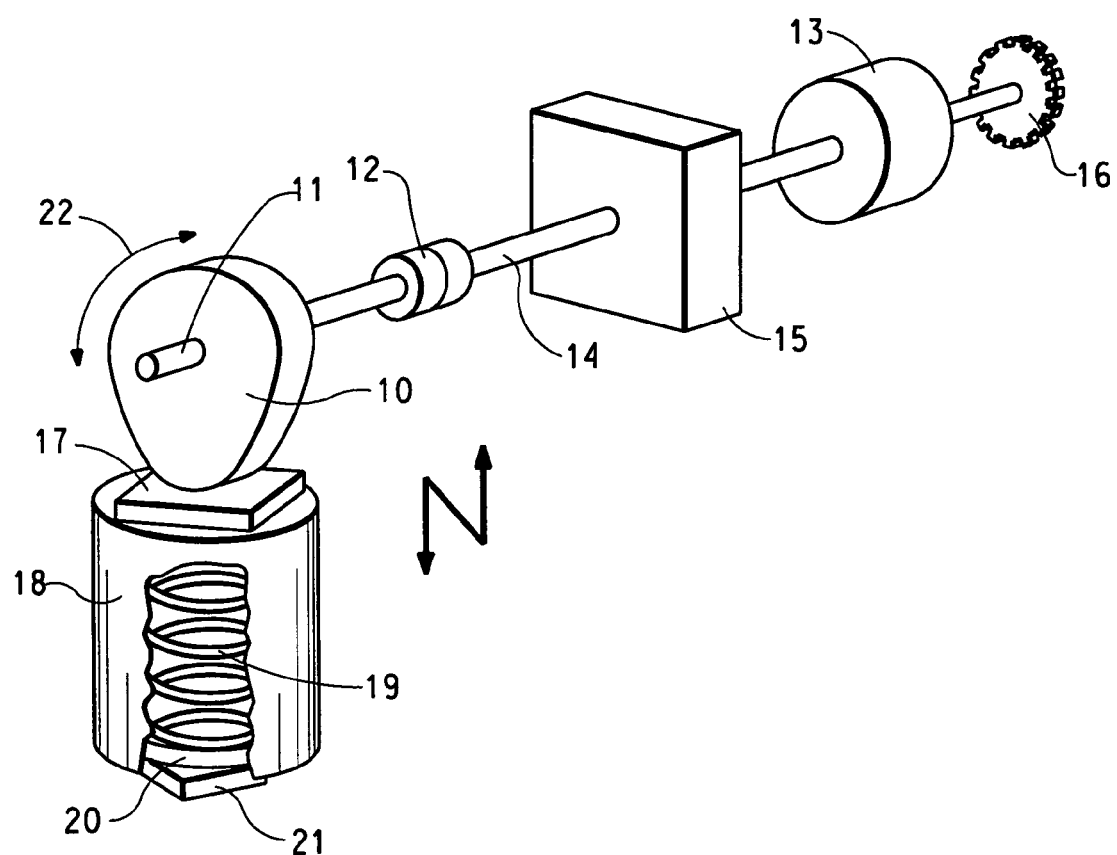
FIG. 1 is a schematic showing the construction of the rotor cam-type abrasion wear tester used to measure friction coefficient and wear in test pieces fabricated in the examples.

The resin composition of the invention comprises a thermoplastic polymer and a mesoporous powder impregnated with a lubricating oil. Thermoplastic polymers that can be used in the invention include polyacetals, polyamides, polyesters, polycarbonates or polyphenylene sulfides. A polyacetal or a polyamide is preferred.

As used herein, the term "mesoporous materials" refers to materials having a number average pore diameter of between about 20 and about 500 Å. Porous materials have been classified as micro- and mesoporous depending on their average pore diameter, where microporous materials have an average pore diameter of less than about 20 Å, and mesoporous materials have an average pore diameter of between about 20 and about 500 Å. See for example "Ordered Mesoporous Molecular Sieves Synthesized by a Liquid Crystal Template Mechanism"; C. T. Kresge et al., *Nature*, vol. 359 (1992), p. 710.

The polyacetal can be one or more homopolymers, copolymers, or a mixture thereof. Homopolymers are prepared by polymerizing formaldehyde and/or formaldehyde equivalents, such as cyclic oligomers of formaldehyde. Copolymers are derived from one or more comonomers generally used in preparing polyacetals in addition to formaldehyde and/or formaldehyde equivalents. Commonly used comonomers include acetals and cyclic ethers that lead to the incorporation into the polymer chain of ether units with 2-12 sequential carbon atoms. If a copolymer is selected, the quantity of comonomer will not be more than 20 weight percent, preferably not more than 15 weight percent, and most preferably about two weight percent. Preferable comonomers are 1,3-dioxolane, ethylene oxide, and butylene oxide, where 1,3-dioxolane is more preferred, and preferable polyacetal copolymers are copolymers where the quantity of comonomer is about 2 weight percent. It is also preferred that the homo- and copolymers are: 1) homopolymers whose terminal hydroxy groups are end-capped by a chemical reaction to form ester or ether groups; or, 2) copolymers that are not completely end-capped, but that have some free hydroxy ends from the comonomer unit or are terminated with ether groups. Preferred end groups for homopolymers are acetate and methoxy and preferred end groups for copolymers are hydroxy and methoxy.

Suitable thermoplastic polyamides can be condensation products of dicarboxylic acids and diamines, and/or aminocarboxylic acids, and/or ring-opening polymerization products of cyclic lactams. Suitable dicarboxylic acids include adipic acid, azelaic acid, sebacic acid, dodecanedioic acid, isophthalic acid, and terephthalic acid. Suitable diamines include tetramethylenediamine, hexamethylenediamine, octamethylenediamine, nonamethylenediamine, dodecamethylenediamine, decamethylenediamine, 2-methylpentamethylenediamine, 2-methyloctamethylenediamine, trimethylhexamethylenediamine, bis(p-aminocyclohexyl) methane, m-xylylenediamine, and p-xylylenediamine. A suitable aminocarboxylic acid is 11-aminododecanoic acid. Suitable cyclic lactams are caprolactam and laurolactam. Preferred polyamides include aliphatic polyamide such as polyamide 6; polyamide 6,6; polyamide 4,6; polyamide 6,10; polyamide 6,12; polyamide 11; polyamide 12; and semi-aromatic polyamides such as poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethyleneadipamide-hexamethyleneterephthalamide copolyamide (polyamide 6,T/6,6), hexamethyleneterephthalamide-2-methylpentamethyleneterephthalamide copolyamide (polyamide 6,T/D,T); and copolymers and mixtures of these polymers.

Preferred thermoplastic polyesters (which have mostly or all ester linking groups) are normally derived from one or more dicarboxylic acids (or their derivatives such as esters) and one or more diols. In preferred polyesters the dicarboxylic acids comprise one or more of terephthalic acid, isophthalic acid and 2,6-naphthalene dicarboxylic acid, and the diol component comprises one or more of $HO(CH_2)_nOH$ (I), 1,4-cyclohexanedimethanol, $HO(CH_2CH_2O)_mCH_2CH_2OH$ (II), and $HO(CH_2CH_2CH_2CH_2O)_zCH_2CH_2CH_2CH_2OH$ (III), wherein n is an integer of 2 to 10, m on average is 1 to 4, and z is on average about 7 to about 40. Note that (II) and (III) may be a mixture of compounds in which m and z, respectively, may vary and since m and z are averages, they do not have to be integers. Other diacids that may be used form the thermoplastic polyester include sebacic and adipic acids. Hydroxycarboxylic acids such as hydroxybenzoic acid may be used as comonomers. Specific preferred polyesters include poly(ethylene terephthalate) (PET), poly(1,3-propylene terephthalate) (PPT), poly(1,4-butylene terephthalate) (PBT), poly(ethylene 2,6-napthoate), poly(1,4-cylohexyldimethylene terephthalate) (PCT), a thermoplastic elastomeric polyester having poly(1,4-butylene terephthalate) and poly(tetramethyleneether)glycol blocks (available as Hytrel® from E. I. DuPont de Nemours & Co., Inc., Wilmington, Del. 19898 USA) and copolymers of any of these polymers with any of the above mentioned diols and/or dicarboxylic acids.

The mesoporous powder used in the present invention is a powder having a number average particle size of between about 0.1 and about 300 μm, and preferably between about 1 and about 30 μm. Mesoporous powders that can be used include metal oxides such as silica (silicon dioxide) and alumina; carbonates such as calcium carbonate and barium carbonate; silicates such as calcium silicate, barium silicate and magnesium silicate; and phosphates such as calcium phosphate, barium phosphate, magnesium phosphate, zirconium phosphate and apatite. Alternatively, use can be made of mesoporous powders of organic compounds such as polystyrenes, polyethylenes, polyurethanes, cellulose, and cellulose derivatives, polyvinyl formals, phenol resins, epoxy resins and urea resins in a spongy form. Such materials are described, for example, in "Production of Micron-Sized Monodisperse Polymer Particles Having one Hollow Structure"; H. Minami, *Polymer Print*, Japan, Vol. 53 (2004), p. 27.

Illustrative examples of the lubricating oil used in the invention include synthetic oils, mineral oils, saturated and unsaturated hydrocarbons, fatty acids, fatty acid esters, metal salts of saturated and unsaturated fatty acids (metallic soaps), and paraffinic waxes. Preferred fatty acids and fatty acid esters include those with 17 or more carbon atoms. Examples include palmitic acid, stearic acid, and their esters and metal salts. The lubricating oil may be suitably selected according to such considerations as the intended use of the shaped article and the working conditions under which it will be used.

Impregnation of the lubricating oil into the mesoporous powder can be carried out by various methods. Typical examples of impregnation of various chemical compounds into the mesoporous powders are described in Japanese Patent application JP2003-286196A. For example, the lubricating oil can be added to the mesoporous powder under a reduced pressure, then forcibly impregnated into the pores. This method can be carried out by placing the mesoporous powder in a vacuum chamber having an adjustable internal pressure, reducing the pressure within the vacuum chamber, adding the lubricating oil, mixing it thoroughly with the mesoporous powder, then releasing the vacuum in the chamber to atmospheric pressure after a period of about 30 minutes has elapsed. If the lubricating oil is a solid at ambient temperature, use can be made of a solution or dispersion prepared by dissolution or dispersion in a suitable low-boiling solvent. In cases where a solution or dispersion is used, after the vacuum chamber is released to atmospheric pressure the resulting powder is heated and the solvent is removed by evaporation, yielding an oil-impregnated mesoporous powder.

Alternatively, when silica or alumina is used as the mesoporous powder, the oil-impregnated mesoporous powder can be obtained from the synthesis of mesoporous silica or alumina powders by a wet method in the presence of the oil. One such method, in the case of silica, is to disperse the lubricating oil in an alkaline silicic acid solution and then neutralize the solution, forming silica particles. The lubricating oil is be impregnated into the interior of the silica particles while they are being formed from solution.

The lubricating oil-impregnated mesoporous powder used in the invention contains about 20 to about 60 weight percent, or preferably about 30 to about 55 weight percent of lubricating oil, based on the total weight of the powder plus the oil. The lubricating oil-impregnated mesoporous powder is present in composition of the present invention in about 0.2 to about 10 weight percent, or preferably about 0.5 to about 5 weight percent, based on the total weight of the composition. The concentration of lubricating oil in the mesoporous powder and amount of lubricating oil-impregnated mesoporous powder is preferably selected such that the total amount of lubricating oil in the composition is about 0.3 to about 2 weight percent, based on the total weight of the composition. This allows the composition to be molded under standard molding conditions and the shaped articles obtained therefrom are able to maintain a low friction coefficient and incur minimal wear over an extended period of time.

The composition of the present invention may further comprise additives such as colorants, plasticizers, oxidative stabilizers, light stabilizers, thermal stabilizers, fillers, reinforcing agents, impact modifiers, flame retardants, and the like.

The compositions of the present invention can be prepared by melt-blending the thermoplastic resin and the lubricating oil-impregnated mesoporous powder with a conventional device such as a roll mill or extruder.

The compositions of the present invention can be processed into shaped articles by ordinary melt-processing techniques such as injection molding, compression molding, extrusion or blow molding. The lubricating oil-impregnated mesoporous powder releases the impregnated lubricating oil when a normal force is exerted on the contact surface of the shaped article at a sliding or mating surface thereof. The lubricating oil that is released forms a lubricating film on the surface of the shaped article and serves to maintain a low friction coefficient over an extended period of time and to minimize the amount of wear. The shaped articles of the invention are useful as components requiring lubrication, such as bearing bushings, gears, cams, rollers, bearings, switch sliders and fasteners.

EXAMPLES

Lubricating oil-impregnated mesoporous powders were prepared by impregnating a porous silica powder or a porous cross-linked olefin resin powder with synthetic fatty ester oil having a viscosity of 40 mm²/s. The impregnation procedure is described in JP 2002-346381.

The following powders were used in the examples.
    Powder X: porous silica powder (average particle size of 2 to 5 μm; oil content of 50%)
    Powder Y: porous cross-linked olefin resin (average particle size of 2 to 5 μm; oil content of 50%)
    Powder Z: porous silica powder (average particle size of 2 to 5 μm; contains no lubricating oil)

The following thermoplastic resins were used.
    POM-A: polyoxymethylene homopolymer (Delrin® 500P NC010; melt flow rate of 10.5 g/10 min; density of 1.42)
    PA-B: un-reinforced nylon 6,6 resin (Zytel® 101 HSL; density of 1.14)

Wear Test Method:

The friction coefficient and amount of wear were measured using a rotor cam-type abrasion wear tester like that shown in FIG. 1. In this tester, the cam 10 is fixed to a rotating shaft 11. The rotating shaft 11 is connected through a coupler 12 to a motor 13. The motor 13 has a motor shaft 14 to which are connected a torque meter 15 and a digital tachometer 16 for measuring torque and rotational speed. A test piece 17 is held in place on a sample holder 18, and the sample holder 18 is fastened by a coil spring 19 to a support 20. A strain gauge 21 mounted on the support 20 measures the force that acts upon the test piece 17. The measurements were carried out using a stainless steel (S45C) cam 10 having a minimum radius of 12.5 mm, a maximum radius of 16.5 mm and a width of 5 mm, and a coil spring 19 having a spring constant of 100 N/mm.

A 165×20×4 mm ISO tensile bar test 17 having a thickness of about 4 mm (or 0.4 cm) was placed on the sample holder 18 and the cam 10 was rotated, thereby pushing the test piece 17 downward and generating a pressing force at the surface of the test piece 17 due to the resiliency of the coil spring 19. When the speed of the cam 10 was set at 120 rpm, the maximum perpendicular stress was between 140 and 160 N. The torque meter 15 was used to measure the rotational torque T of the motor 13 during rotation of the cam 10. The dynamic coefficient of friction μ at the point on the cam 10 where the maximum perpendicular stress F is applied can be calculated from the formula $$\mu = T/(r \times F) \quad (1).$$

In formula (1), the letter r represents the maximum diameter of the cam 10. In this test, the friction characteristics for each of the samples were compared using the dynamic coefficient of friction values obtained when the cam was rotated 5,000 times at 120 rpm.

The surface of the cam 10 contact area was polished with sandpaper (mesh size # 500) before each friction test.

The amount of wear was evaluated by measuring the depth of the abrasion marks that formed on the test pieces following the above procedure. The length L (mm) and maximum depth D (mm) of the abrasion marks were measured. Assuming the width of the abrasion marks to be 7.5 mm, the amount of wear W (mg) was determined as follows:

$$W = m \times L \times D \times 7.5/2 \quad (2).$$

In formula (2), m represents the density of the resin material.

Example 1

Resin pellets were prepared by mixing 98.5 weight percent of POM-A and 1.5 p weight percent of powder X, then compounding the mixture in a 40 mm single-screw extruder. These resin pellets were injection molded into ISO test pieces (16.5×20×0.4 cm). The resin temperature during injection molding was set at 200 to 220° C. and the mold temperature was set at 85 to 90° C.

Examples 2 to 5

The procedure of Example 1 was followed for Examples 2-5, except that 99.5, 99.0, 98.0, and 97.0 weight percent of POM-A, and 0.5, 1.0, 2.0, and 3.0 weight percent of powder Y, respectively, were used.

Comparative Example 1

The procedure of Example 1 was followed, except that no powder X was added.

Comparative Example 2

The procedure of Example 1 was followed, except that powder Z, which contained no lubricating oil, was used instead of powder X.

Comparative Example 3

The procedure of Example 1 was followed, except that 96.0 weight percent POM-A and 4.0 weight percent powder X were used.

Comparative Example 4

The procedure of Example 2 was followed, except that 92.0 weight percent POM-A and 8.0 weight percent powder Y was used.

The results of wear testing, coefficient of friction measurements, Charpy impact strength (as measured following JIS K7111:1996), and moldability determination for each of Examples 1-5 and Comparative Examples 1-4 are given in Table 1.

TABLE 1

| | Resin | Oil-impregnated powder Type | Amount of Powder added (%) | Oil content in the composition (%) | Moldability | Charpy Impact Strength (kJ/m²) | Amount of wear (mg) | Coefficient of friction |
|---|---|---|---|---|---|---|---|---|
| EX 1 | POM-A | X | 1.5 | 0.75 | no problem | 6.8 | 0.73 | 0.20 |
| EX 2 | POM-A | Y | 0.5 | 0.25 | no problem | 4.7 | 1.32 | 0.22 |

TABLE 1-continued

|  | Resin | Oil-impregnated powder Type | Amount of Powder added (%) | Oil content in the composition (%) | Moldability | Charpy Impact Strength (kJ/m²) | Amount of wear (mg) | Coefficient of friction |
|---|---|---|---|---|---|---|---|---|
| EX 3 | POM-A | Y | 1.0 | 0.50 | no problem | 5.5 | 0.30 | 0.17 |
| EX 4 | POM-A | Y | 2.0 | 1.00 | no problem | 4.6 | 1.08 | 0.17 |
| EX 5 | POM-A | Y | 3.0 | 1.50 | no problem | 3.5 | 0.89 | 0.13 |
| CE 1 | POM-A | none | 0.0 | 0.00 | no problem | 6.7 | 1.76 | 0.25 |
| CE 2 | POM-A | Z | 1.5 | 0.75 | no problem | 6.1 | 2.20 | 0.30 |
| CE 3 | POM-A | X | 4.0 | 2.00 | Not Moldable | Not Measurable | not measurable | not measurable |
| CE 4 | POM-A | Y | 8.0 | 4.00 | Not Moldable | Not Measurable | not measurable | not measurable |

As is apparent from Table 1, increasing the amount of lubricating oil-impregnated porous powder lowers the coefficient of friction and the amount of wear. However, at an oil content of more than 2 percent in the composition, the molten resin slipped inside the barrel during the molding process, making molding impossible to carry out.

Example 6

Resin pellets were prepared by compounding 99 weight percent of PA-B and 1 weight percent of powder X in a 40 mm single-screw extruder. These resin pellets were injection molded into ISO test pieces (16.5×2.0×0.4 cm). The resin temperature during injection molding was set at 260 to 280° C. and the mold temperature was set at 85 to 90° C.

Example 7

The procedure of Example 6 was followed, except that 98 weight percent of PA-B and 2 weight percent of powder X were used.

Examples 8 and 9

The procedure of Example 6 was followed, except that 99 weight percent of PA-B and 1 weight percent of powder Y (Example 8) and 98 weight percent of PA-B and 2 weight percent of powder Y (Example 9) were used.

Comparative Example 5

The procedure of Example 6 was followed, except that no powder X was added.

Comparative Example 6

The procedure of Example 6 was followed, except that 96 weight percent PA-B and 4 weight percent powder X was used.

Comparative Example 7

The procedure of Example 8 was followed, except that 96 weight percent PA-B and 4 weight percent powder Y was used.

The results of wear testing, coefficient of friction measurements, Charpy impact strength (as measured following JIS K7111:1996, or, equivalently, ISO standard test 179/1eA) and moldability determination for each of Examples 6-9 and Comparative Examples 5-7 are given in Table 2.

TABLE 2

|  | Resin | Oil-impregnated powder Type | Amount of Powder added (%) | Oil content in the composition (%) | Moldability | Charpy Impact Strength (kJ/m²) | Amount of wear (mg) | Coefficient of friction |
|---|---|---|---|---|---|---|---|---|
| EX 6 | PA-B | X | 1.0 | 0.50 | no problem | 4.78 | 1.8 | 0.40 |
| EX 7 | PA-B | X | 2.0 | 1.00 | no problem | 4.67 | 2.1 | 0.30 |
| EX 8 | PA-B | Y | 1.0 | 0.50 | no problem | 5.51 | 1.5 | 0.42 |
| EX 9 | PA-B | Y | 2.0 | 1.00 | no problem | 5.64 | 2.4 | 0.38 |
| CE 5 | PA-B | none | 0.0 | 0.00 | no problem | 4.96 | 2.5 | 0.42 |
| CE 6 | PA-B | X | 4.0 | 2.00 | no problem | 5.23 | 3.7 | 0.25 |
| CE 7 | PA-B | Y | 4.0 | 2.00 | no problem | 6.64 | 9.6 | 0.32 |

It is apparent from Table 2 that, as with the use of a polyacetal resin, when a polyamide resin is used, increasing the amount of lubricating oil-impregnated porous powder lowers the coefficient of friction and also lowers the amount of wear. However, at an oil content of more than 2 percent, based on the total weight of the composition, the coefficient of friction continued to decrease but the amount of wear showed a tendency to increase.

Moreover, when the silica-based porous powder X and the polymer-based porous powder Y are directly compared at the same content level (Example 6 versus Example 8, and Example 7 versus Example 9), higher Charpy impact values were obtained with the use of the polymer-based porous powder Y at both content levels. Therefore, the use of a polymer-based porous powder can be expected to improve the impact resistance.

It is apparent from the above that by including a lubricating oil-impregnated mesoporous powder in the thermoplastic resin composition of the invention and setting the oil content of the composition in a range of about 0.3 to about 2.0, there can be obtained a thermoplastic resin composition which exhibits both low wear and a low coefficient of friction.

The invention claimed is:

1. A thermoplastic resin composition comprising
at least one thermoplastic polymer and
at least one lubricating oil-impregnated mesoporous powder;
wherein the thermoplastic resin is a polyamide resin and the total amount of lubricating oil present in the composition is between about 0.3 and about 2 weight percent, based on the total weight of the composition.

2. The composition of claim 1, wherein the lubricating oil has a viscosity at 40° C. of 10 to 100 mm$^2$/s.

3. The composition of claim 1, wherein the mesoporous powder has a particle size of between about 0.1 and 300 μm.

4. The composition of claim 1, wherein the mesoporous powder is one or more selected from the group consisting of metal oxides, metal carbonates, metal silicates, and metal phosphates.

5. The composition of claim 1, wherein the mesoporous powder is one or more selected from the group consisting of silica, alumina, calcium carbonate, barium carbonate, calcium silicate, barium silicate, magnesium silicate, calcium phosphate, barium phosphate, magnesium phosphate, zirconium phosphate, and apatite.

6. The composition of claim 1, wherein the mesoporous powder is one or more spongy polymers selected from the group consisting of polystyrenes, polyethylenes, polyurethanes, cellulose, and cellulose derivatives, polyvinyl formals, phenol resins, epoxy resins and urea resins.

7. The composition of claim 1, wherein the lubricating oil is one or more selected from the group consisting of synthetic oils, mineral oils, saturated and unsaturated fatty acids, metal salts of saturated and unsaturated fatty acids, esters of salts of saturated and unsaturated fatty acids, and paraffinic waxes.

8. A shaped article made from the composition of claim 1.

9. The article of claim 8 in the form of a bearing bushing, a gear, a cam, a roller, a bearing, a switch sliders, or a fastener.

10. A thermoplastic resin composition comprising
at least one thermoplastic polymer and
at least one lubricating oil-impregnated mesoporous powder selected from the group consisting of polystyrenes, polyethylenes, polyurethanes, cellulose, and cellulose derivatives, polyvinyl formals, phenol resins, epoxy resins and urea resins,
wherein the total amount of lubricating oil present in the composition is between about 0.3 and about 2 weight percent, based on the total weight of the composition.

11. The composition of claim 10, wherein the thermoplastic polymer is a polyacetal resin.

12. The composition of claim 10, wherein the thermoplastic polymer is a polyamide resin.

13. The composition of claim 10, wherein the lubricating oil has a viscosity at 40° C. of 10 to 100 mm$^2$/s.

14. The composition of claim 10, wherein the mesoporous powder has a particle size of between about 0.1 and 300 μm.

15. The composition of claim 10, wherein the lubricating oil is one or more selected from the group consisting of synthetic oils, mineral oils, saturated and unsaturated fatty acids, metal salts of saturated and unsaturated fatty acids, esters of salts of saturated and unsaturated fatty acids, and paraffinic waxes.

16. A shaped article made from the composition of claim 10.

17. The article of claim 16 in the form of a bearing bushing, a gear, a cam, a roller, a bearing, a switch sliders, or a fastener.

* * * * *

UNITED STATES PATENT AND TRADEMARK OFFICE
CERTIFICATE OF CORRECTION

| | |
|---|---|
| PATENT NO. | : 7,659,230 B2 |
| APPLICATION NO. | : 11/281520 |
| DATED | : February 9, 2010 |
| INVENTOR(S) | : Kenichi Shinohara |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Thirtieth Day of November, 2010

David J. Kappos
*Director of the United States Patent and Trademark Office*